United States Patent [19]
Burger et al.

[11] Patent Number: 5,969,666
[45] Date of Patent: Oct. 19, 1999

[54] RADAR-BASED METHOD OF MEASURING THE LEVEL OF A MATERIAL IN A CONTAINER

[75] Inventors: Stefen Burger, Freiburg; Carsten Fitsch, Bad Säckingen, both of Germany

[73] Assignee: Endress + Hauser GmbH +Co., Maulburg, Germany

[21] Appl. No.: 09/089,618

[22] Filed: Jun. 3, 1998

[30] Foreign Application Priority Data

Jun. 6, 1997 [DE] Germany .............. 197 23 978

[51] Int. Cl.$^6$ ............................. G01S 13/08
[52] U.S. Cl. .............................. 342/124
[58] Field of Search ............... 342/124; 340/612; 73/290 R

[56] References Cited

U.S. PATENT DOCUMENTS 5,614,911   3/1997   Otto et al. .................. 342/124

FOREIGN PATENT DOCUMENTS 24 08 772 B2   9/1975   Germany .
44 07 369 A1   9/1995   Germany .

*Primary Examiner*—Daniel T. Pihulic
*Attorney, Agent, or Firm*—Bose McKinney & Evans

[57] ABSTRACT

In measuring the level of a material in a container by a radar-based method the echo profile of the received microwaves is registered and a maximum of the echo profile established for determining the microwaves reflected by the material surface. To avoid false readings in the case of a double echo causing in the echo profile a double blip of two overlapping echo blips, consecutive maximum and minimum values of the slope of the echo profile and their distance values are determined starting from the established maximum in the direction towards smaller distances. The amplitude value of the echo profile assigned to the distance value located in the middle between the distance value of the first minimum slope and the distance value of the next maximum slope is used as the peak value of the first echo blip of the double blip decisive for level measuring.

5 Claims, 3 Drawing Sheets

RADAR-BASED METHOD OF MEASURING THE LEVEL OF A MATERIAL IN A CONTAINER

BACKGROUND OF THE INVENTION

1. Field of the Invention

The invention relates to a radar-based method of measuring the level of a material in a container in which, by means of the antenna of a ranging device arranged above the highest level anticipated, microwaves are radiated downwards and reflected microwaves received, the echo profile representing the amplitude values of the received microwaves as a function of the transit time or the distance corresponding to the transit time is registered, a maximum of the echo profile is determined for detecting the echo blip in the echo profile originating from the echo waves reflected by the material surface and the distance of the material surface from the antenna is obtained from the peak value of this echo blip.

2. Description of the Prior Art

In prior art methods of this type it is assumed that the maximum of the echo profile corresponds to the peak value of the echo blip originating from the echo waves reflected by the material surface so that the distance of the material surface from the antenna can be determined from the distance value assigned to this peak value. It may, however, occur that this requirement is not satisfied when a double echo arrives at the antenna caused by the microwaves being reflected not only by the material surface but also by an interface located just below the material surface. One such interface is formed, for example, by the bottom of the container when the level of material therein is very low. If the material has a small dielectric constant only a relatively minor proportion of the impinging microwaves is reflected by the material surface whilst the remainder of the impinging microwaves passes through the material and is reflected by the bottom of the container. In the case of a low material level and a small dielectric constant the microwaves passing through the material are attenuated to only a minor degree; accordingly it may occur that the echo wave reflected by the material surface has a smaller amplitude than that of the echo wave reflected by the bottom of the container. The two echo waves arrive at the antenna, the echo wave reflected by the bottom of the container being delayed relative to the echo wave reflected by the material surface by an interval in time corresponding to the distance between the material surface and the bottom of the container. When this distance is small, the blips originating from the two echo waves in the echo profile overlap, forming a double blip. Measuring the level on the basis of the maximum of the echo function may then result in a false reading when the echo wave reflected by the bottom of the container has a greater amplitude than that of the echo wave reflected by the material surface due to this maximum not being located at the distance value of the peak value of the echo blip originating from the echo wave reflected by the material surface.

The same phenomenon occurs when the reflecting interface is not the bottom of the container but an interface between two substances having greatly differing dielectric constants located just below the material surface, this applying, for example, to a film of oil floating on water.

SUMMARY OF THE INVENTION

The object of the invention is to provide a method of the aforementioned kind which permits determining the distance value assigned to the material surface in the case of a double echo resulting in the occurrence of a double blip made up of two echo blips overlapping in the echo profile.

For achieving this object the invention provides a radar-based method of measuring the level of a material in a container in which, by means of the antenna of a ranging device arranged above the highest level anticipated, microwaves are radiated downwards and reflected microwaves received, the echo profile representing the amplitude values of the received microwaves as a function of the transit time or the distance corresponding to the transit time is registered, a maximum of the echo profile is determined for detecting the echo blip in the echo profile originating from the echo waves reflected by the material surface and the distance of the material surface from the antenna is obtained from the peak value of this echo blip, wherein on occurrence of a double blip comprising two overlapping echo blips, of which the first echo blip originates from the microwaves reflected by the material surface whilst the second echo blip originates from the microwaves reflected by an interface located just below the material surface and has a larger peak value than the first echo blip, the following method steps are put to use for determining the peak value of the first echo blip:

A: starting from said determined maximum of the echo profile corresponding to the peak value of the double blip the measurement points of the echo profile located in the direction towards smaller distance values are evaluated to determine a) the first maximum slope of the echo profile located nearest to said maximum of the echo profile and the corresponding distance value;

b) the minimum slope of the echo profile located nearest to said first maximum slope and the corresponding distance value;

c) the second maximum slope of the echo profile located nearest to said minimum slope and the corresponding distance value;

B: the distance value located in the middle between the distance value of said second maximum slope and the distance value of said minimum slope is used as the distance value of the peak value of the first echo blip and the corresponding amplitude value is used as the peak value of the first echo blip to obtain the distance of the material surface from the antenna.

BRIEF DESCRIPTION OF THE DRAWING

Further features and advantages of the invention read from the following description of an example embodiment with reference to the drawings in which.

DESCRIPTION OF THE PREFERRED EMBODIMENT

Figure 1:
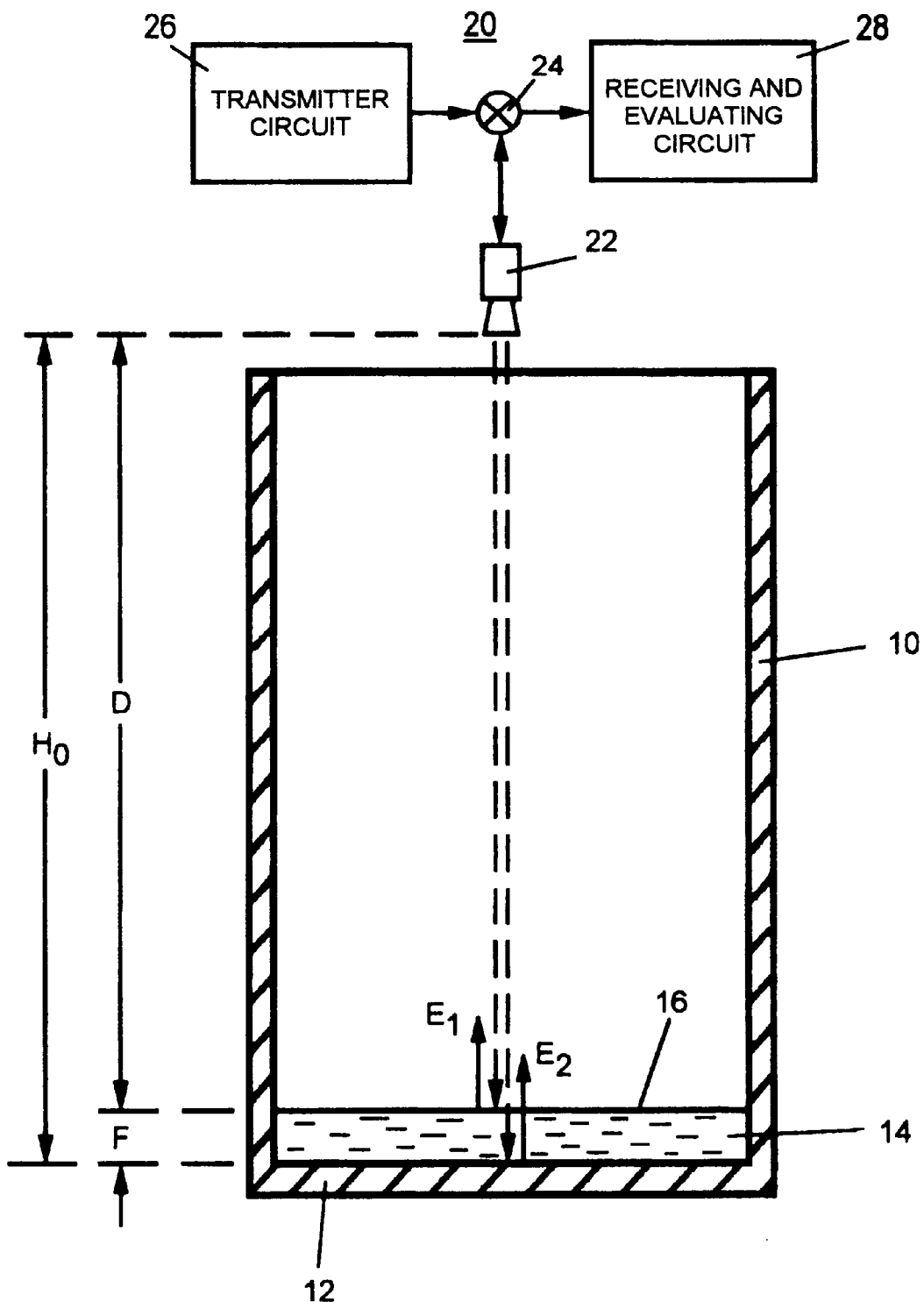
FIG. 1 is a schematic illustration of an assembly for radar-based level measuring in a container applicable by the method in accordance with the invention.

Referring now to FIG. 1 there is illustrated a container 10 having a bottom 12, filled up to a filling height F with a material 14 so that the material surface 16 is located at a distance F away from the container bottom 12. The level in the container 10 is identified either as the filling height F or the volume of the material 14 corresponding to the filling height F. In a container having a constant cross-section over its full height the material volume is proportional to the filling height F; in containers failing to satisfy this requirement the relation between the filling height F and the material volume can be determined by computation or by trial and represented by a curve or a look-up table. In any case, measuring the filling height F suffices to measure the level in the container.

In the container 10 as shown in FIG. 1 measuring the filling height F is done by a ranging device 20 operating as a microwave pulsed radar system. The ranging device 20 contains a transmit-receive antenna 22 which is connected via a duplexer 24 to a transmitter circuit 26 and to a receiving and evaluating circuit 28. The transmitter circuit 26 generates in periodic time intervals ultra-high frequency pulses which are fed to the antenna 22. The antenna 22 is arranged above the maximum level anticipated in the container 10 so that it radiates the ultra-high frequency pulses arriving from the transmitter circuit 26 perpendicularly downwards in the form of microwaves and receives microwaves coming from below. The microwaves received by the antenna 22, to which more particularly the echo waves reflected from the surface 16 of the material belong, are fed via the duplexer 24 to the receiving and evaluating circuit 28. In the receiving and evaluating circuit 28 the microwaves received by the antenna 22 are evaluated to detect the echo waves reflected from the surface of the material and to measure their transit time. From the measured transit time between the instant of transmission of a microwave pulse by the antenna and arrival of the echo pulse reflected from the material surface 16 at the antenna 22 the distance D between the antenna 22 and the material surface 16 can be computed due to the known propagation velocity of the microwaves. The filling height F is then given by the difference between the installation height $H_0$ of the antenna 22 above the the container bottom 12 and the measured distance D:

$$F = H_0 - D.$$

Figure 2:
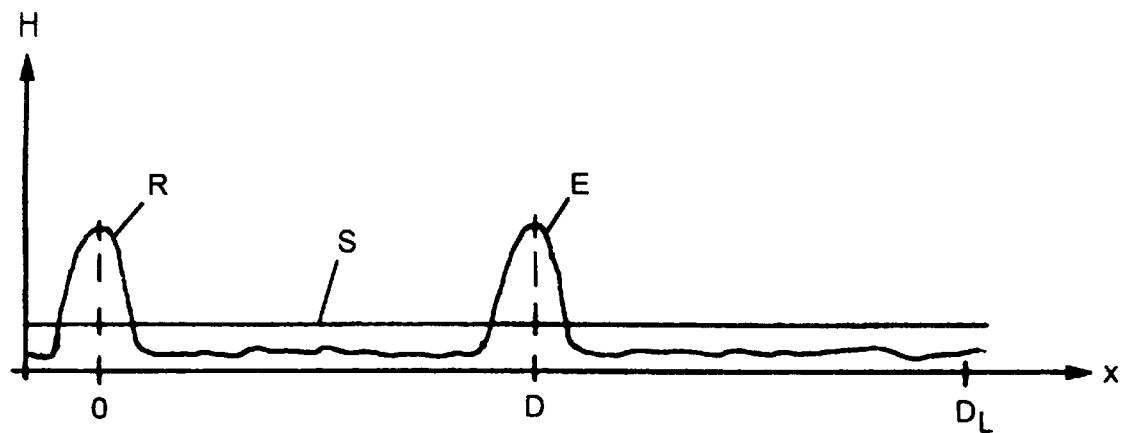
FIGS. 2 to 5 are diagrams explaining the functioning of the assembly as shown in FIG. 1 for use in the method in accordance with the invention.

For evaluating the received microwaves in the receiving and evaluating circuit 28 it is usual to plot the echo profile representing the amplitude values of the received microwaves as a function of the transit time or, which is the same in effect, the distance covered by the microwaves. In the case of a pulsed radar system the echo profile is given by the envelope curve of the received microwaves. Referring now to FIG. 2 there is illustrated as an example the plot of the envelope curve H as a function of the distance x covered twice by the microwaves (round trip distance) as obtained normally in measuring the level in a container. It will be noted that over almost the full distance range up to the maximum distance $D_L$, measured with the container empty and thus termed the "empty distance", the envelope curve H has a relatively low value corresponding to the noise level as well as buried clutter; the envelope curve exhibiting, however, two substantially higher blips R and E. The blip R originates from the transmitted pulse and results from the fact that although the duplexer 24 passes on the majority of each transmitted pulse to the antenna 22, a minor proportion is passed on to the receiving and evaluating circuit 28 where it together with the microwaves received by the antenna 22 is incorporated in the echo profile and can be used as a reference blip R. The blip E originates from the echo waves reflected by the material surface 16 and forms the echo blip which is evaluated for determining the distance D between the antenna 22 and the material surface. The noise and clutter proportion is usually suppressed by a threshold profile S so that only the amplitude values of the envelope curve exceeding the threshold profile S are subjected to evaluation.

Determining the distance D is done in the simplest case by searching for a maximum of the envelope curve H in the range adjoining the reference pulse R. This maximum may correspond to the maximum amplitude value of the envelope curve. In accordance with another method in addition to determining the echo having the maximum amplitude, i.e. the maximum of the envelope curve, also the echo first arriving in time is determined. When the amplitude of this first echo is larger than the maximum amplitude reduced by an adjustable factor the first echo is selected as the wanted echo. The condition for this may be, for example, that the amplitude of the first echo needs to be larger than the maximum amplitude reduced by 20 dB. It is assumed in any case that the detected maximum corresponds to the peak value of the echo blip E originating from the microwaves reflected by the material surface. Then, on the x axis, the distance of this maximum from a reference point 0 is determined which corresponds to the location of the peak value of the reference blip R, for example. This distance corresponds to the distance D between the antenna 22 and the material surface 16.

Figure 3:
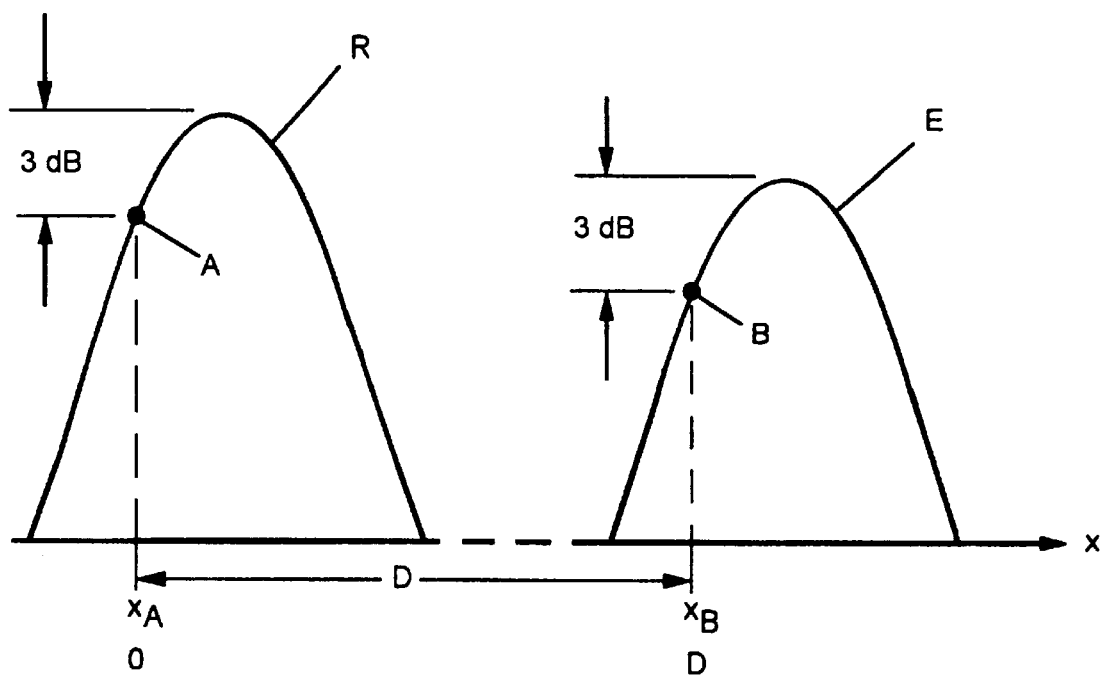

This simplest method of determining the distance D has the drawback that the precise location of the peak value of the echo blip E can be determined only with relatively low accuracy because the amplitude of the echo blip changes only slowly in the region of the peak value. Referring now to FIG. 3 there is illustrated another method for determining the distance D which results in higher accuracy. To make things clearer only the sections of the envelope curve H containing the reference blip R and the echo blip E are represented on a magnified scale in the plot as shown in FIG. 3.

In this method point A in the reference blip R is searched for on the leading edge, the amplitude of which is below the peak value by a specific amount, this being 3 dB in the example shown, and the distance value $x_A$ of this point A is established on the x axis. In the echo blip E the amplitudes of the measuring points located prior in time to the peak value are evaluated and the distance value $x_B$ of the measuring point B is established, the amplitude of which is below the peak value by the same predetermined amount, i.e. again 3 dB in the example illustrated. The measuring point, the amplitude of which is 3 dB down from peak value can be established with particularly high accuracy because the amplitude of the echo blip changes only little in the region of the peak value and thus this amplitude can be determined very precisely; and the distance value of this measuring point can be determined with high accuracy because the measuring point is located on a steep portion of the slope.

The wanted distance D then directly results from the spacing of the distance values $x_A$ and $x_B$ since this spacing is just as large as the spacing between the peak values of the two blips, but it is determined with higher accuracy for the reasons given above. When the distance value $x_A$ is assigned the value 0 the wanted distance D corresponds to the distance value $x_B$.

The plot as shown in FIG. 2 in which the echo blip E is located roughly in the middle between the distance value 0 and the empty distance $D_L$ corresponds to the case in which the container 10 is roughly half full. Determining the distance D is in this case possible with no problem by one of the two methods as discussed above with reference to FIG. 2 and FIG. 3.

In the case as shown in FIG. 1 there is, however, the problem that the filling height F in the container 10 is very low, and more particularly so when the material has a low dielectric constant. In this case only a relatively low proportion of the impinging microwaves is reflected as the echo wave $E_1$ by the material surface 16, whilst the remainder of the impinging microwaves passes through the material 14 and is reflected by the bottom 12 of the container 10 as echo wave $E_2$. Due to the low filling height F and the low dielectric constant of the material the microwaves passing through the material 14 are attenuated only weakly. Thus, it may occur that the amplitude of the echo wave $E_1$ reflected by the material surface 16 has a smaller amplitude than that of the echo wave $E_2$ reflected by the container bottom 12.

Figure 4:
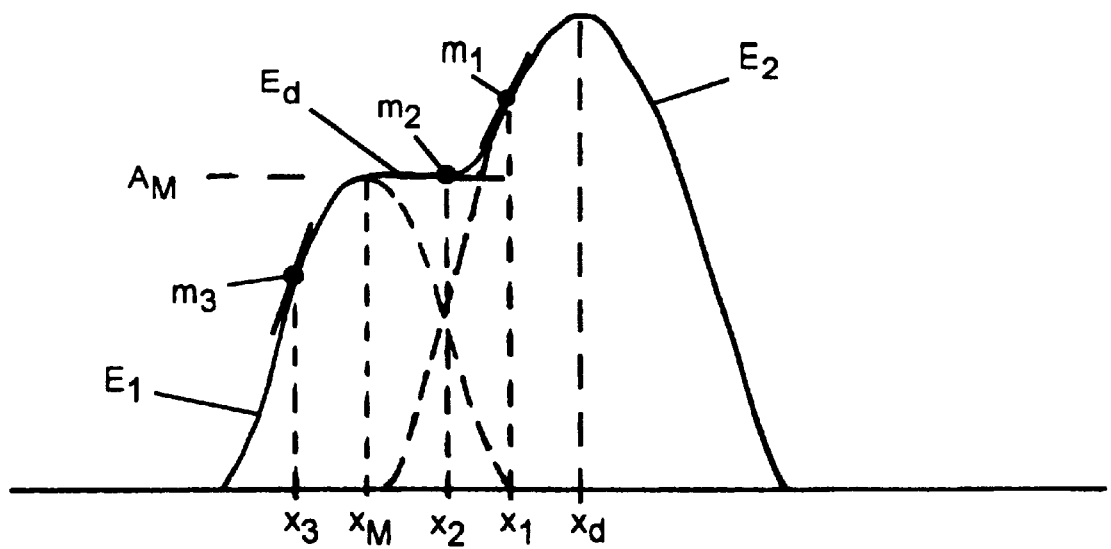
Figure 5:
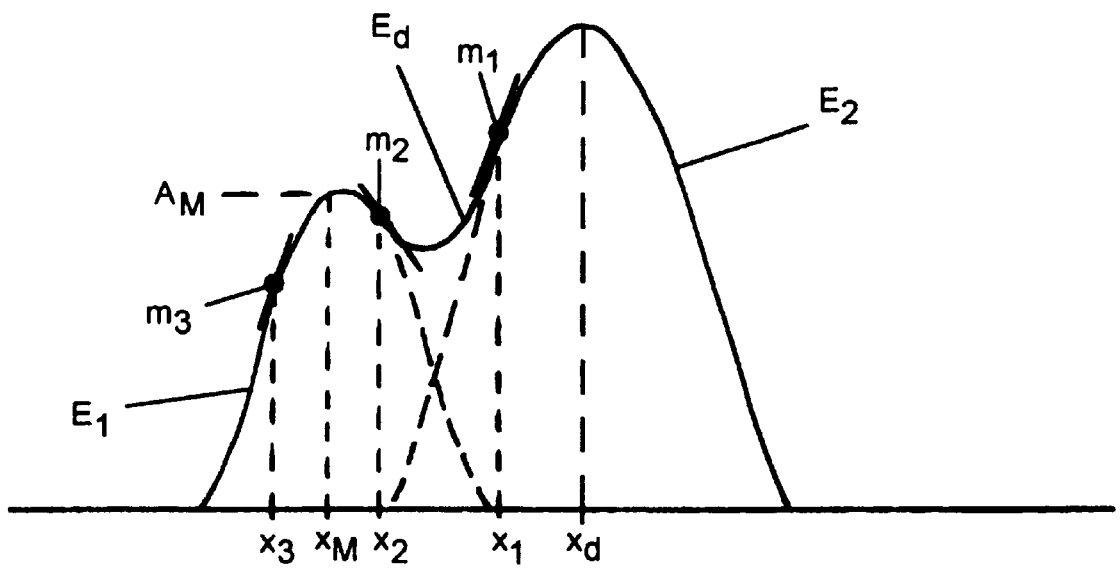

The two echo waves $E_1$ and $E_2$ arrive at the antenna 22, the echo wave $E_2$ being dealyed relative to the echo wave $E_1$ by an interval in time corresponding to the distance F between the material surface 16 and the container bottom 12. When this distance F is small, the echo blips originating from the echo waves $E_1$ and $E_2$ overlap in the envelope curve H as is evident from the plots shown in FIG. 4 and FIG. 5 for the case in which the echo wave $E_2$ is greater in amplitude than echo wave $E_1$. The amplitudes of the echo blips $E_1$ and $E_2$ add up into a double blip $E_d$. The plot as shown in FIG. 5 corresponds to a somewhat greater distance F than in the plot as shown in FIG. 4.

In this case a false reading may occur when the signal is evaluated in keeping with one of the methods as discussed above with reference to FIG. 2 and FIG. 3 due to the maximum of the envelope curve H being located at the point of the echo blip $E_2$ originating from the echo wave reflected by the container bottom 12, thus resulting in the true level, given by the peak value of the echo blip $E_1$ failing to be detected and, instead, a wrong indication given that the container is empty.

This error occurs, incidentally, not only when the material surface 16 is located a minor distance away from the bottom of the container 12 but also when some other reflecting interface is located just below the material surface, especially when this interface separates two substances from each other having very different dielectric constants as applying, for example, to a film of oil floating on water.

The double echo method of evaluation described in the following makes it possible in the case of a double echo causing a double blip of two overlapping echo blips to establish the position of the maximum of the echo profile to be assigned to the reflection of the microwaves by the material surface 16 so that the false reading as described above is avoided. This method will now be explained with reference to the plots as shown in FIG. 4 and FIG. 5.

Starting from the first established maximum of the envelope curve H corresponding to the peak value of the double blip $E_d$ and located at the distance value $x_d$ the amplitudes of the measuring points prior in time to the maximum are evaluated to determine the slope m of the envelope curve H at these measuring points, from which the following three slopes of the echo profile and the corresponding distance values are established:

a) the first maximum slope $m_1$ of the echo profile located nearest to the maximum of the echo profile and the corresponding distance value $x_1$;

b) the minimum slope $m_2$ of the echo profile located nearest to the first maximum slope $m_1$ of the echo profile and the corresponding distance value $x_2$;

c) the second maximum slope $m_3$ of the echo profile located nearest to the minimum slope $m_2$ of the echo profile and the corresponding distance value $x_3$.

Referring now to FIG. 4, the minimum slope $m_2$ is located at the position at which the double blip $E_d$ translates into the horizontal. This minimum slope $m_2$ thus corresponds to the slope 0. In determining the minimum slope $m_2$ it is, however, to be noted that this is not to be understood as being the absolute value, but the algebraic value taking the sign into account, this being the reason why in FIG. 5 the minimum slope $m_2$ is not located at the slope 0 but at the largest negative slope.

After having established these three slopes and the corresponding distance values a plausibility check is done to see whether evaluating the double blip makes sense. For this purpose the quotient $$Q = m_2/m_1$$

is formed from the minimum slope $m_2$ divided by the first maximum slope $m_1$ and compared to a reference value. The reference value is determined empirically; it having, for example, the order of magnitude of 0.8. If the quotient is smaller than the reference value a distance value $x_M$ is computed according to the following equation:

$$x_M = x_2 - 0.5 \cdot (x_2 - x_3).$$

The distance value $x_M$ thus lies in the middle between the distance value $X_3$ of the second maximum slope $m_3$ and the distance value $x_2$ of the minimum slope $m_2$. In addition, the amplitude $A_M$ of the echo profile belonging to this distance value $x_M$ is established. The amplitude $A_M$ is taken to be the maximum of the envelope curve decisive for determining the distance D of the material surface, this maximum being located at the distance value $x_M$. Using these values the distance D is then determined preferably by the method as explained with reference to FIG. 3. The distance value $x_B$ in this case is the distance of the measurement point located on the leading edge of the double blip below the amplitude $A_M$ by the predetermined amount of 3 dB, for example, this amplitude having been established according to the method of double echo evaluation.

When, instead, the quotient Q is greater than the reference value, determining the distance D is done with the maximum of the envelope curve as originally established. The same as in the case of the slope minimum, here too, the rule applies that the algebraic value of the quotient Q is to be used; i.e. a negative quotient Q is always smaller than the positive reference value.

In the same way, double echo evaluation is discontinued as soon as the double blip has such a low amplitude at the distance value $x_3$ of the second maximum slope $m_3$ that it is practically buried in noise.

The steps in the method of double echo evaluation as indicated above are implemented program-controlled by a computing circuit contained in the receiving and evaluating circuit 28. Preferably double echo evaluation can be disabled so that the user can determine whether it is to be implemented or not. When enabled, it is implemented every time in determining the maximum of the echo function at least up to the plausibility check. To obviate the time needed for computation thereof, it is preferably disabled when, for example, no double echoes are anticipated due to the nature of the material concerned.

In the example embodiment as discussed above, level measuring was done on the basis of a pulsed radar system. It will be appreciated, however, that the invention is not restricted to this system, it also being suitable for other methods working according to the radar principle, more particularly for those in which an echo profile can be generated. This applies especially to FMCW radar (Frequency Modulated Continuous Wave radar). In the FMCW method a continuous microwave is transmitted which is periodically linearly frequency-modulated, for example according to a sawtooth function. The frequency of each received echo signal thus shows a difference to the momentary frequency which the transmitted signal has at the instant of reception, this difference in frequency being a function of the transit time of the echo signal. The difference in frequency between the transmitted signal and the received signal which can be obtained by mixing both signals and evaluating the Fourier spectrum of the mixed signal thus corresponds to the distance of the reflecting surface away from the antenna, and the level of the frequency characteristic corresponds to the amplitude of the echo. Accordingly, this Fourier spectrum represents in this case the echo profile which can be evaluated in the same way as the echo profile obtained by the pulsed radar method.

We claim:

1. A radar-based method of measuring the level of a material in a container in which, by means of the antenna of a ranging device arranged above the highest level anticipated, microwaves are radiated downwards and reflected microwaves received, the echo profile representing the amplitude values of the received microwaves as a function of the transit time or the distance corresponding to the transit time is registered, a maximum of the echo profile is determined for detecting the echo blip in the echo profile originating from the echo waves reflected by the material surface and the distance of the material surface from the antenna is obtained from the peak value of this echo blip, wherein on occurrence of a double blip comprising two overlapping echo blips, of which the first echo blip originates from the microwaves reflected by the material surface whilst the second echo blip originates from the microwaves reflected by an interface located just below the material surface and has a larger peak value than the first echo blip, the following method steps are put to use for determining the peak value of the first echo blip:

A: starting from said determined maximum of the echo profile corresponding to the peak value of the double blip the measurement points of the echo profile located in the direction towards smaller distance values are evaluated to determine a) the first maximum slope of the echo profile located nearest to said maximum of the echo profile and the corresponding distance value;

b) the minimum slope of the echo profile located nearest to said first maximum slope and the corresponding distance value;

c) the second maximum slope of the echo profile located nearest to said minimum slope and the corresponding distance value;

B: the distance value located in the middle between the distance value of said second maximum slope and the distance value of said minimum slope is used as the distance value of the peak value of the first echo blip and the corresponding amplitude value is used as the peak value of the first echo blip to obtain the distance of the material surface from the antenna.

2. The method as set forth in claim 1, wherein following implementation of method step A the quotient of said minimum slope divided by said first maximum slope of the echo profile is formed and compared to a predetermined reference value, method step B being implemented only when said quotient is below said reference value.

3. The method as set forth in claim 1, wherein the distance of the material surface from the antenna is obtained from the difference between the distance value of a point located on the leading edge of a reference blip below the peak value of said reference blip by a predetermined amount and the distance value of a point located on the leading edge of the double blip below seid amplitude value established as the peak value of the first echo blip by the same predetermined amount.

4. The method as set forth in claim 3, wherein said predetermined amount is 3 dB.

5. The method as set forth in claim 3, wherein the ranging device works according to the pulsed radar technique and said reference blip is formed by a proportion of the transmitted pulse fed to the antenna.

* * * * *